United States Patent Office 3,350,135
Patented Oct. 31, 1967

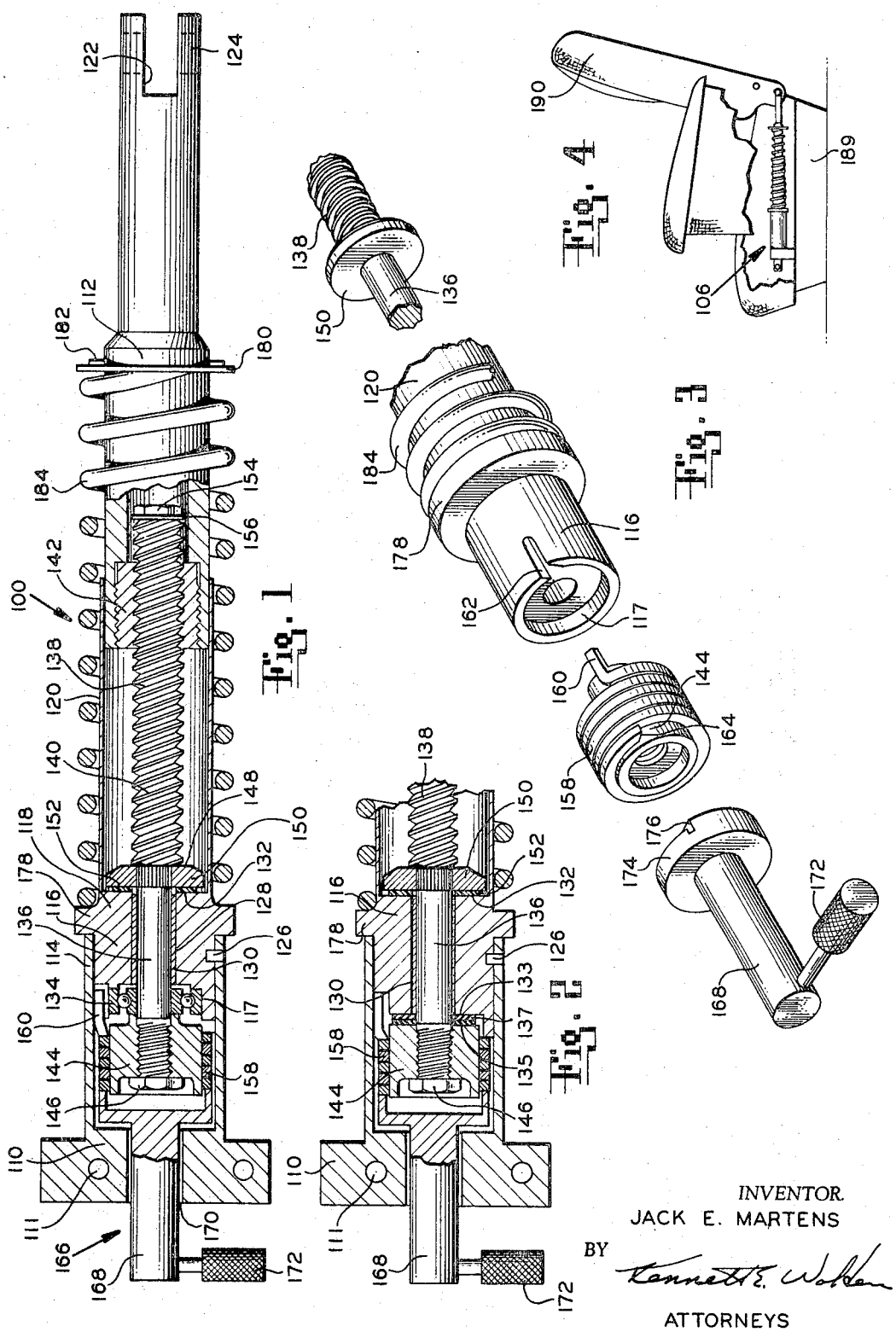

3,350,135
POSITION RETAINING DEVICE
Jack E. Martens, Bloomfield Hills, Mich., assignor to The Anderson Company, a corporation of Indiana
Continuation of applications Ser. No. 297,586, July 25, 1963, and Ser. No. 402,359, Oct. 7, 1964. This application Mar. 15, 1966, Ser. No. 536,211
3 Claims. (Cl. 297—355)

ABSTRACT OF THE DISCLOSURE

This disclosure is to an extensible and retractable device for use with seats for holding a positionable back at the desired location. Its structure comprises axially extensible and retractable members, one provided with a nut and the other with a rotatable screw, each having relatively steep threading so that a force applied axially on the members tend to cause rotation of the screw and permits adjustment of the members. A brake is provided for selectively preventing rotation of the screw to retain the members in a desired position. A load bearing member, in contact with the screw, has frictional characteristics such that upon release of the brake, rotation of the screw remains substantially constant irrespective of the applied axial load to thereby dampen movement of the members.

---

This application is a continuation of application Ser. No. 297,586, filed July 25, 1963 and application Ser. No. 402,359, filed Oct. 7, 1964 each application now abandoned.

This invention relates to a position-retaining device which is particularly adapted for use on chairs having positionable backs.

In the prior art, a common type of seat-positioning device is hydraulically controlled or actuated. One of the characteristics of such a device is that the hydraulic fluid acts as a cushion between relatively movable parts thereof to dampen any sudden movement.

An object of this invention is to provide an improved position-retaining device.

Another object of this invention is to provide an improved position-retaining device employing movement-dampening means.

Another object of this invention is to provide a position-retaining device with dampening means for controlling speed of operation.

Other objects and advantages of the invention will become apparent after the description hereinafter set forth is considered in conjunction with the drawing annexed hereto.

In the drawing:

FIGURE 1 is a partially cut-away side view of a position-retaining device;

FIGURE 2 is a cut-away view of one end of the mechanism showing an alternate form;

FIGURE 3 is an exploded view of part of the elements of FIGURE 1; and

FIGURE 4 diagrammatically represents a seat with a positionable back empolying this type of position-retaining or holding device.

The position-retaining device, as disclosed in the various figures of the drawing, is for holding a load in compression. It will be appreciated that with a reversal of the threading on the screw and nut, or reversal of coil direction of the brake, the device may be rearranged for holding in tension.

FIGURE 4 shows the position-retaining device on a chair wherein it is mounted between a stationary base 189 and a positionable back rest 190. In this arrangement the position-retaining device is adapted to hold in compression but is submissive to a load in tension, such as caused by a seat occupant manually tilting the back rest 190 forward. It will be obvious that the use of such a device is not limited to a chair but may find use on beds or other reclining furniture as well. Use on reclining backs for seats of busses, trains, airplanes or automobiles is believed obvious.

The device generally designated 100 comprises a pair of telescoping members 110 and 112, respectively, which are adapted to be attached to relatively movable parts or bodies of a chair or bed. Member 110 includes wing portions provided with holes 111 for anchoring by pins or bolts to one of the above-mentioned movable portions, for example, the chair base as shown in FIGURE 4. Member 110 includes a cylindrical extension 114 providing a recess for receiving a base 116 of an intermediate portion 118. The intermediate portion includes sleeve extension 120. This last-mentioned extension is generally cylindrical and is adapted to telescopically receive an inner portion of member 112. Member 112 is generally cylindrical throughout its length and may terminate in an outer end of reduced diameter. This outer end is bifurcated and provided with openings 124 to facilitate attachment by a pin to one of the relatively positionable bodies, for example, a tiltable back.

One or more pins 126 are received radially through the cylindrical wall 114 and projecting into base 116 for holding members 110 and 118 fixedly assembled in axial alignment.

Considering the disclosure of FIGURE 1, base 116 is provided with an axially disposed cylindrical opening 128 which receives bearing bushing 130 press-fitted therein. An axially disposed shoulder 132, disposed adjacent opening 128 within sleeve 120, will be more fully described later in the specification. The other end of base 116 is counterbored or otherwise provided with a recess 117 for receiving a bearing 134.

As can be seen in FIGURE 1, an elongate rod 138 includes a cylindrical portion 136 which is received through bushing 130 and bearing 134 for rotation about its longitudinal axis. The outer end of the rod is provided with relatively steep threading 140 for cooperation with a nut 142 which is fixedly carried by the inner end of member 112. The inner end of the rod is provided with threading and a lock nut 146 for fixedly retaining thereon brake drum 144. Other means within the art may be employed to secure the brake drum on the rod.

The junction between cylindrical portion 136 and threading 140 defines an axial shoulder 148 against which thrust collar 150 is fixedly positioned. It will be noted that splines are provided on cylindrical portion 136 adjacent shoulder 148 so that collar 150 may be more readily secured thereto. A washer 152 of Teflon or other material having similar characteristics is provided between shoulder 132 and collar 150. Teflon has been found to have characteristics providing the necessary resilience and coefficient of friction with metal to provide the desired dampening and drag of rotation on rod 138. The surface of collar 150 adjacent the Teflon washer is polished to a smooth surface relative to that of shoulder 132. Therefore, relative movement is between washer 152 and collar 150. The purpose of this feature will be more fully described hereinafter.

Nut 142 previously referred to as fixedly carried by the inner end of member 112 has internal threading of relatively steep pitch for cooperating with the relatively steep pitch of threading 140 on rod 138. The outer peripheral surface of nut 142 is provided with threading for reception in a complementary threaded recess within the inner end of member 112. A pin or other means (not shown) may be used to prevent rotation of the nut within the recess to prevent disassembly therefrom.

The outer end of rod 138 receives nut 154 and washer 156 thereon to limit axial movement between members 110 and 112 and to prevent their becoming disassembled by reason of nut 142 travelling off the end of threading 140 on rod 138.

Brake means defined by a helically disposed resilient coil 158 surrounds drum 144 for gripping engagement thereon. As shown in FIGURE 3, the coil is left-hand wound whereas the screw and nut contains right-hand threading. By this arrangement, the position-holding device is adapted to resist great loads in compression but yield to loads in tension applied between members 110 and 112 beyond a predetermined amount. The load which can be held in compression is substantially greater than the load which can be held in tension. This is because the coils grip more effectively in one direction than the other. A reversal of threading 140, nut threading, or the coil hand directions would provide a device which would hold greater loads in tension than in compression.

One end of coil brake 158 terminates in an axial projection or tang 160 which is adapted to be received by slot 162 in base portion 116. The other end of the coil brake terminates in a squared end 164. Coil brake 158 is wound so as to have an inside diameter which is normally slightly less than the diameter of the drum 144 so that when it is placed on the drum, there exists frictional gripping engagement therebetween. With the tang 160 restrained from rotation by reason of its position in slot 162, it will be obvious that rotation of screw 138 andd rum 144 in either direction is resisted.

The relationship of brake 158 on drum 144 is clearly shown in FIGURE 3. Whenever the drum is rotated in a counterclockwise direction, as viewed from the right end of FIGURE 1 or 3, the helical coil 158 tends to wind tighter onto drum 144 thereby resulting in a greater holding or gripping action. Conversely, rotation of drum 144 in a clockwise direction tends to unwind coil brake 158 from the drum to thereby permit rotation of the drum by a lesser force. This is caused by the rotation of the drum acting to unwrap the coils to thereby increase their internal diameter.

The inherent resiliency or gripping action of coil brake 158 tends to prevent rotation of drum 144 in either direction below a predetermined figure. This restraint is lowest when the drum is rotating in a direction opposite to the coil hand of brake 158. That is, the coil is less effective in preventing the drum from rotating in the aforementioned clockwise direction. The gripping action of the coil caused by the drum rotation in a counterclockwise direction is considerably increased. Rotation of rod 138 is caused by axial forces action through the relatively steep threads on rod 138 and nut 142. It is apparent from the arrangement described that the position-retaining device is adapted to hold a greater load in one axial direction than in the other.

Release means designated generally by the numeral 166 includes a cylindrical shank portion 168 which is rotatably received through a cylindrical opening 170 in member 110. The outer end of shank 168 is adapted for receiving a laterally extending handle 172 for manual control of the release means. Shank 168 terminates at its inner end in an enlarged head 174 which is provided with a tangentially directed face portion 176 for cooperation with squared end 164 of the coil of brake 158. Manual rotation of the release means to urge face 176 against end 164 expands coil brake 158 to thereby release the gripping or holding action of the coil on drum 144. By this maneuver, the drum and screw are free for rotation in either direction thereby permitting readjustment of members 110 and 112 in either axial direction. It is obvious that relative longitudinal movement of these members is controlled by manual movement of the positionable seat back or by a compression spring (described below), or both.

Helical compression spring 184 is coaxially disposed around members 110 and 112 and is anchored at one end against radial shoulder 178 of portion 118 and at the other end against washer 180 which is fixed by pins or other means 182 on member 112. Whenever coil brake 158 is released from normal gripping action on drum 144, the strentgh of spring 184 is sufficient to urge the position-retaining device (members 110 and 112) to a relatively extended position. When coil brake 158 is gripping drum 144, the action of compression spring 184 alone is not sufficient to extend the members. However, the normal force applied by spring 184, when supplemented by a manual pull on the positionable seat back, is sufficient to overcome the holding action of coil brake 158 in one direction. The gripping action of brake 158 is sufficient to prevent rotation of rod 138 in response to axial compression between members 110 and 112 directed through nut 142.

The arrangement of FIGURE 2 varies from that of FIGURE 1 by reason of a rubber washer 137 being provided between Teflon washer 135 and shoulder 133. Bushing 130 is provided in base 116 and establishes the bearing for shaft portion 136 which rotates therein. Since a ball bearing is not provided in this arrangement, the facing shoulders between base 116 and drum 144 are square so as to present complementary flat surfaces toward one another. The underneath surface of drum 144 is polished for moving contact with Teflon washer 135.

The arrangement disclosed in FIGURE 2 shows a pair of Teflon washers for effective action in either direction. Washer 152 (also washer 135 of FIGURE 2) is provided in a bearing relationship. It has been found that the presence of such a washer between flange 150 and member 118 provides an arrangement whereby free rotation therebetween is substantially retarded so that the relative rotation remains substantially constant in response to axial forces between the first and second members, as for example the force supplied by a seat occupant. The speed at which rod 138 is permitted to rotate relative to the inserted washer appears to have little, if any, relationship with the load carried between the first and second members 110, 112.

The dampening effect characteristic of the metal to Teflon washers prevents sudden start or movement of the seat back. In other words, it simulates hydraulic action but eliminates the many undesirable characteristics of a hydraulic system.

The structure of FIGURE 1 provides for impeding movement on rod 138 to slow rotation preferably in substantially one axial direction of forces between members 110, 112; however, it is effective in the other direction as well. The structure of FIGURE 2 provides for dampening or impeded movement of these members equally in either direction.

When handle 172 is manually manipulated to expand coil brake 158, rod 138 is thereby released for rotation. Spring 184 is then, by itself, sufficient to move members 110, 112 to an extended position. The movement will be slow by reason of the action of the previously described Teflon washer. The action just described will move seat back 190 forward to an upright position. As long as brake 158 remains expanded, the seat occupant may move back 190 to any desired position. In any event, such movement will be slowed by reasons explained above. This slowed movement is desired because it simulates hydraulic restraint. It will be appreciated that the effect of the washer is substantially the same throughout the stroke of the movable members, and is not dependent on the degree of extension or contraction.

Under normal operating conditions, the position-retaining device 100 holds positionable back 190 from movement rearwardly against relatively great loads; however, the holding action may be overcome by a lesser force directed to move the back rest forward. Whenever handle 172 is manipulated to release brake 158, back 190 may be moved forwardly or rearwardly with relative ease. Movement in either direction is always cushioned by reason of the Teflon washers which provide passive restraint.

Having thus described my invention, it is obvious that various modifications may be made in the same without departing from the spirit of the invention; and, therefore, I do not wish to be understood as limiting myself to the exact forms, construction, arrangements and combinations of parts herein shown and described.

I claim:

1. A mechanical position-retaining device for a chair having a positionable back comprising in combination;
   a first member having means for attachment to a chair base,
   a second member rectilinearly movable relative to the first member and having means for attachment to a back positionable with respect to said chair base,
   one of said members having a fixed threaded part and the other of said members rotatably carrying a part having threading for cooperation with said fixed threaded part,
   said threading being relatively steep so that an axial force applied by said back rectilinearly between said first member and said second member tends to rotate said rotatable part,
   brake means cooperable with a portion of said rotatable part and selectively engageable therewith to prevent rotation thereof and to prevent relative rectilinear movement of said first and second members responsive to an axial load applied by said positionable back,
   a member disposed in load carrying relationship between said rotatable part and said other member,
   said member having frictional characteristics such that rotation remains substantially constant in response to varying axial loads when said brake means is disengaged.

2. A mechanical position-retaining device for a chair having a positionable back comprising in combination;
   a first member having means for attachment to a chair base,
   a second member rectilinearly movable relative to the first member and having means for attachment to a back positionable with respect to said chair base,
   one of said members having a fixed threaded part and the other of said members rotatably carrying a part having threading for cooperation with said fixed threaded part,
   said threading being relatively steep so that an axial force applied by said back rectilinearly between said first member and said second member tends to rotate said rotatable threaded part and move said members relative to each other,
   brake means comprising a helical resilient member encircling a portion of said rotatable part and selectively engageable therewith to prevent rotation thereof and to prevent relative rectilinear movement of said first and second members responsive to an axial load applied to said members,
   and means disposed between said rotatable part and said other member in axial load carrying relationship therewith and having frictional characteristics such that said rotation remains substantially constant in response to varying axial loads when said brake means is at least partially released to control the rate at which said members move rectilinearly relative to each other.

3. A mechanical position-retaining device for a chair having a positionable back comprising in combination;
   a first member having means for attachment to a chair base,
   a second member rectilinearly movable relative to the first member and having means for attachment to a back positionable with respect to said chair base,
   one of said members having a fixed threaded part and the other of said members rotatably carrying a rod having threading for cooperation with said fixed threaded part,
   said threading being relatively steep so that an axial force applied by said back rectilinearly between said first member and said second member tends to rotate said rotatable rod,
   brake means cooperable with a portion of said rotatable rod and selectively engageable therewith to prevent rotation thereof and to prevent relative rectilinear movement of said first and second members responsive to an axial load applied by said positionable back,
   and a polytetrafluoroethylene member disposed between said rotatable rod and said other member in load carrying relationship therewith and having frictional characteristics such that rotation of said rod remains substantially constant in response to varying axial loads when said brake means is disengaged.

References Cited

UNITED STATES PATENTS

| | | | |
|---|---|---|---|
| 2,579,305 | 12/1951 | Cushman | 297—361 |
| 2,750,994 | 6/1956 | Howell | 297—375 |
| 3,046,055 | 7/1962 | Martens | 297—361 |
| 3,104,130 | 9/1963 | Martens | 297—355 |
| 3,111,904 | 11/1963 | Burns | 188—83 |
| 3,127,788 | 4/1964 | Martens | 297—374 X |

OTHER REFERENCES

Twiss et al.: Friction of Polytetrafluoroethylene Dry Bearings, in Lubrication Engineering, pp. 255–260, June 1958.

DAVID J. WILLIAMOWSKY, *Primary Examiner.*

G. O. FINCH, *Assistant Examiner.*